United States Patent
Uesaka et al.

(10) Patent No.: US 6,856,709 B2
(45) Date of Patent: Feb. 15, 2005

(54) OPTICAL MODULATION DEVICE

(75) Inventors: Kouichi Uesaka, Kawasaki (JP); Takashi Suga, Yokohama (JP); Hisaaki Kanai, Yokohama (JP); Yoshinori Nagoya, Yokohama (JP)

(73) Assignee: OpNext Japan, Inc., Yokohama (JP)

( * ) Notice: Subject to any disclaimer, the term of this patent is extended or adjusted under 35 U.S.C. 154(b) by 142 days.

(21) Appl. No.: 10/112,795

(22) Filed: Mar. 28, 2002

(65) Prior Publication Data

US 2003/0091258 A1 May 15, 2003

(30) Foreign Application Priority Data

Nov. 11, 2001 (JP) ........................................ 2001-336200

(51) Int. Cl.[7] ............................................. G02F 1/035
(52) U.S. Cl. ................................ 385/2; 385/1; 385/14; 385/130
(58) Field of Search .................... 385/1–3, 14, 129–131

(56) References Cited

U.S. PATENT DOCUMENTS 4,703,996 A * 11/1987 Glass et al. .................... 385/14

FOREIGN PATENT DOCUMENTS

JP          07-106759          4/1995          ............ H05K/3/46

* cited by examiner

*Primary Examiner*—Akm Enayet Ullah
*Assistant Examiner*—Kevin S Wood
(74) *Attorney, Agent, or Firm*—Townsend and Townsend and Crew LLP

(57) ABSTRACT

The provision of a coplanar waveguide coupled with a microstrip line with a transmission line substrate that is used between two functional units of different impedance characteristics allows the input and output impedance matching to be performed, the impedance matching between which coplanar waveguide and microstrip line is performed by the variation of the signal linewidth. It allows the transmission characteristics of the optical transmission device in high frequency band to improve.

14 Claims, 14 Drawing Sheets

1901 ELEMENT 1
1902 TRANSMISSION LINE SUBSTRATE
1903 ELEMENT 2

OPTICAL MODULATION DEVICE

FIELD OF THE INVENTION

The present invention relates to an optical transmission device provided with a structure to interconnect functional units having different input and output impedances through a transmission line substrate.

DESCRIPTION OF THE RELATED ART

Most of the prior optical transmission devices provided with a structure to interconnect two functional units having different input and output impedances through a transmission line substrate are intended for handling the transmission frequency of 1 GHz or less, which transmission devices adopt a linear transmission substrate as designed on the basis of a so-called 50 Ù reference impedance system, which system does not give importance to impedance matching.

However, where the high frequency of 1 GHz or more such as 10 Gbps or 40 Gbps is transmitted, it is required to vary the configuration of the transmission line for impedance matching. The conventional methods for impedance matching include (1) varying the thickness or relative permittivity of a dielectric, (2) thinning the width of the signal line layer as a whole and (3) altering a portion of the configuration of the signal line.

One example of the third method is shown in the Japanese Patent Application Laid-open No. HEI7-106759, in which prior reference it is disclosed that the configuration of the microstrip signal line that is laid on the thin film multi-layered substrate and interposed between two devices is partly or overall varied, according to which varied configuration impedances vary, and in FIG. 2 of which reference a line structure having two different widths is shown, the middle portion of which structure is narrowed in width and in FIG. 4 of which reference a line structure having two different thickness is shown, the middle portion of which structure is recessed in thickness while in FIG. 3 of which reference a line structure with the width thereof linearly varied is shown.

Due care is not taken into the configuration of the prior transmission line according to the frequency characteristics of the functional units. Especially, where the transmission line is disposed between a modulator and a driving IC to apply voltage to the same modulator, a transmission line substrate provided with both coplanar and microstrip structures is put to practical use, but due care is not taken to perform impedance matching for the signal voltage having the frequency of 1 GHz or more as applied from the driving IC to the boundary between those structures and the microstrip structure while to restrain transmission efficiency from deteriorating owing to reflection.

In other words, where the signal of high frequency band is transmitted by means of the coplanar arrangement in combination with the arrangements as shown in FIGS. 2 and 4 of the prior reference as described above with the functional units having different output and input impedances connected thereto, reflection occurs within the transmission line and the engagement regions with the functional units so as to reduce the transmission efficiency at the frequency of 1 GHz or more.

Further, also when the line structure linearly transits as shown in FIG. 3 of the prior reference as described above, reflection occurs so as to reduce transmission efficiency where the signal of high frequency with 1 GHz or more is transmitted.

SUMMARY OF THE INVENTION

The present invention is to improve the transmission efficiency at the high frequency band of 1 GHz or more, especially, within the range either from 37 GHz to 80 GHz or from 1 GHz through 23 GHz by arranging the transmission line according to the same range.

One example of the optical transmission device according to the present invention comprises a transmission line substrate provided with a coplanar waveguide and a microstrip line, a first means whose input impedance becomes larger in proportion to the increase of frequency, the first means being connected to the coplanar waveguide and a second means whose output impedance becomes smaller in inverse proportion to the increase of frequency, the second means being connected to the microstrip line, wherein a widthwise slow constriction with regard to the planar configuration of a signal line corresponding to the microstrip line has a width narrower than the average width of the signal line extending through the respective ends thereof, which width corresponds to the shortest vertical interval with regard to the direction in which the signal line extends or the shortest parallel interval with regard to the input side of the substrate.

The provision of the constriction with the microstrip line corresponding to the transmission line of the substrate provided with the optical transmission device allows the transmission of a signal having a frequency within the range from 1 GHz through 23 GHz to be subjected to impedance matching with the reflection within the transmission line or the engagement region thereof with the functional units constrained, which improves transmission efficiency.

The slow constriction as mentioned above is arc-shaped or a shape as obtained by gradually varying the inclination of the straight line within the angle of 90 degrees or less.

Another example of the optical transmission device according to the present invention comprises a transmission line substrate provided with a coplanar waveguide and a microstrip line, a first means whose input impedance becomes larger in proportion to the increase of frequency, the first means being connected to the coplanar waveguide, a second means whose output impedance becomes smaller in inverse proportion to the increase of frequency, the second means being connected to the microstrip line. The planar shape of a signal line corresponding to the microstrip line is arc-shaped or provided with a protrusion with the degree to which it protrudes varied within the range of 90 degrees or less, the width of the protrusion being broader than the average width of the signal line extending through the respective ends thereof.

This allows the transmission efficiency of the frequency ranging from 37 GHz through 80 GHz to improve, as the impedance matching is performed with the reflection within the transmission line or at the engagement region with the functional units in check.

Further, another example of the optical transmission device according to the present invention comprises a transmission line substrate provided with a coplanar waveguide and a microstrip line, a first means whose input impedance becomes larger in proportion to the increase of frequency, the first means being connected to the coplanar waveguide and a second means whose output impedance becomes smaller in inverse proportion to the increase of frequency, the second means being connected to the microstrip line. The relation between a part $z1$ of an impedance of the microstrip line, which part approximates to the input impedance, a part $z3$ thereof that approximates to the output impedance, and a part $z2$ that is sandwiched between $z1$ and z3, meets any one of the following conditions, z1>z2>z3 and z2>(z1+z3)/2, z1>z3>z2, z2>z1>z3, and z1>z2>z3 and z2>(z1+z3)/2.

This allows the transmission efficiency of high frequency ranges to improve.

Figure 20:
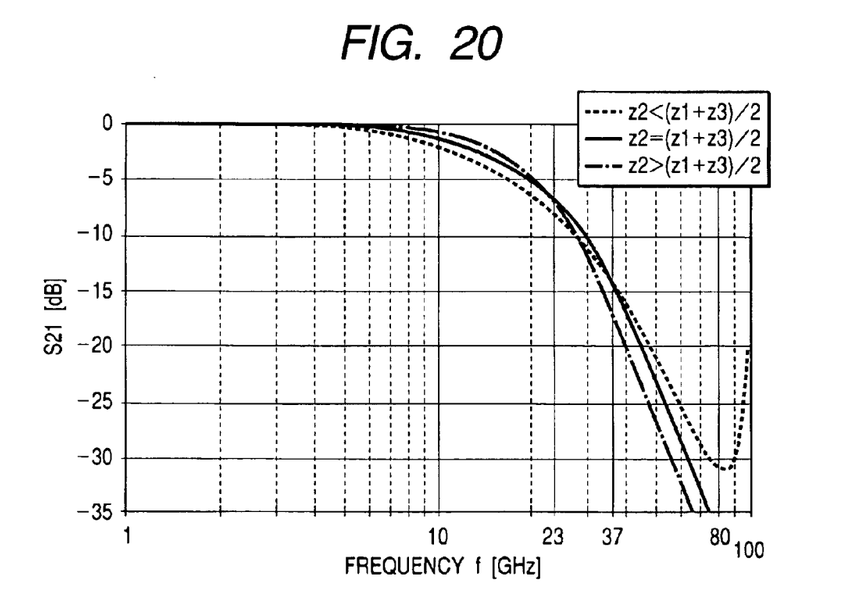
FIG. 20 is a view showing the simulation result of the characteristics of the frequency of transmission line vs. gain thereof S21.

Especially, where the relation therebetween meets either of the following conditions, z1>z2>z3 and z2>(z1+z3)/2, z2>z1>z3 and z2>(z1+z3)/2, it allows the transmission efficiency of the high frequency band from 1 GHz through 23 GHz to improve as shown in FIG. 20.

Then, where the relation therebetween meets either of the following conditions, z1>z3>z2, z1>z2>z3 and z2<(z1+z3)/2, it allows the transmission efficiency of the frequency ranging from 37 GHz through 80 GHz to improve as shown in FIG. 20.

To note, it is preferred to realize the above conditions by increasing or decreasing the width of the signal line on the standpoint of etching process, but they may be realized by adjusting the thickness thereof instead.

These and other objects, features and advantages of the invention will be apparent from the following more particular description of preferred embodiments of the invention, as illustrated in the accompanying drawings.

DESCRIPTION OF THE PREFERRED EMBODIMENTS

Figure 21:
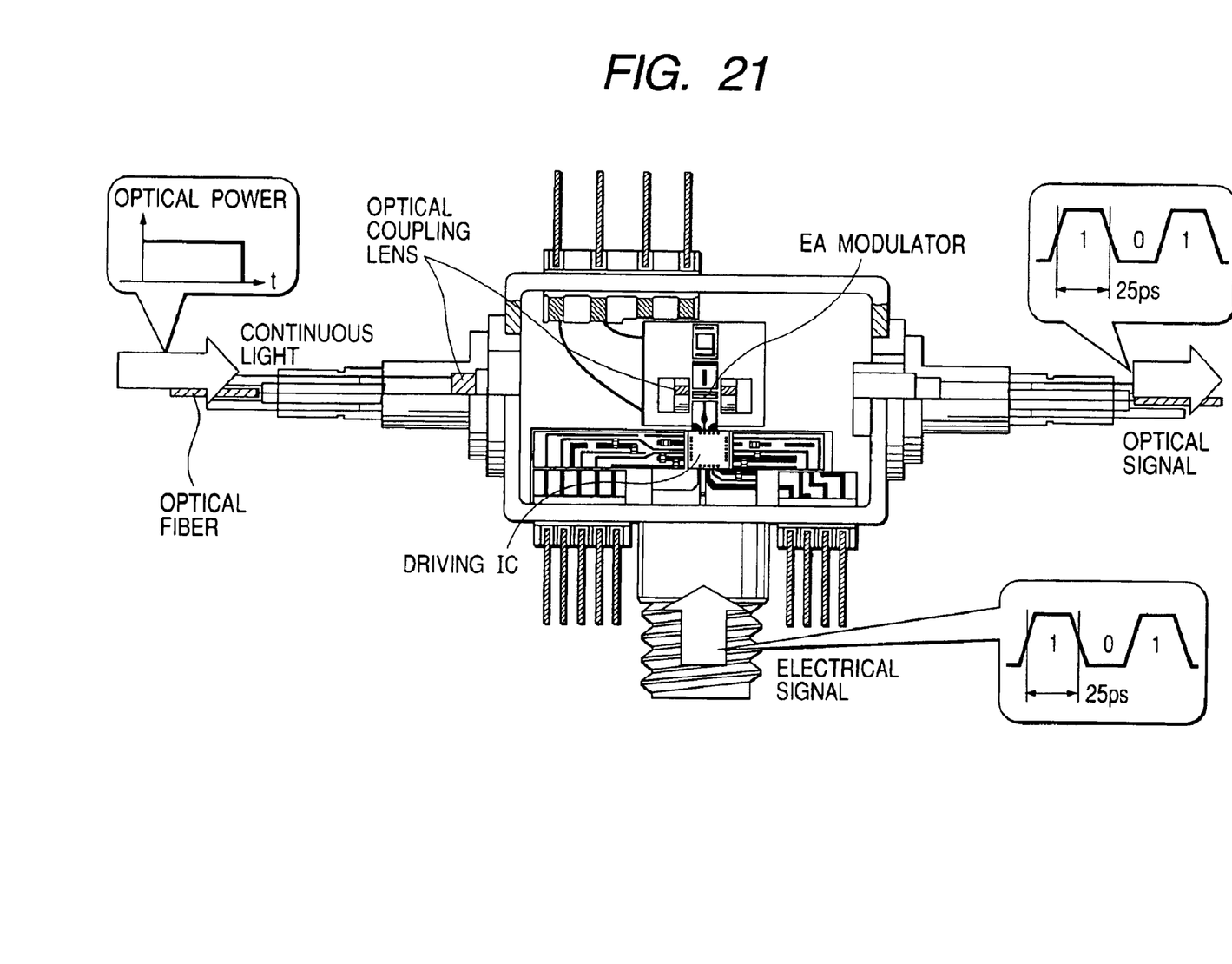
FIG. 21 is a sectional view of an optical transmission device according to the present invention.

The sectional view of the optical transmission device according to the present invention is shown in FIG. 21.

This device is provided with a function to modulate light that passes through an optical fiber by the voltage as applied to a modulator (EA modulator), which voltage is controlled by a driving semiconductor chip (a driving IC) so as to be transmitted as a signal having a frequency as required.

Figure 22:
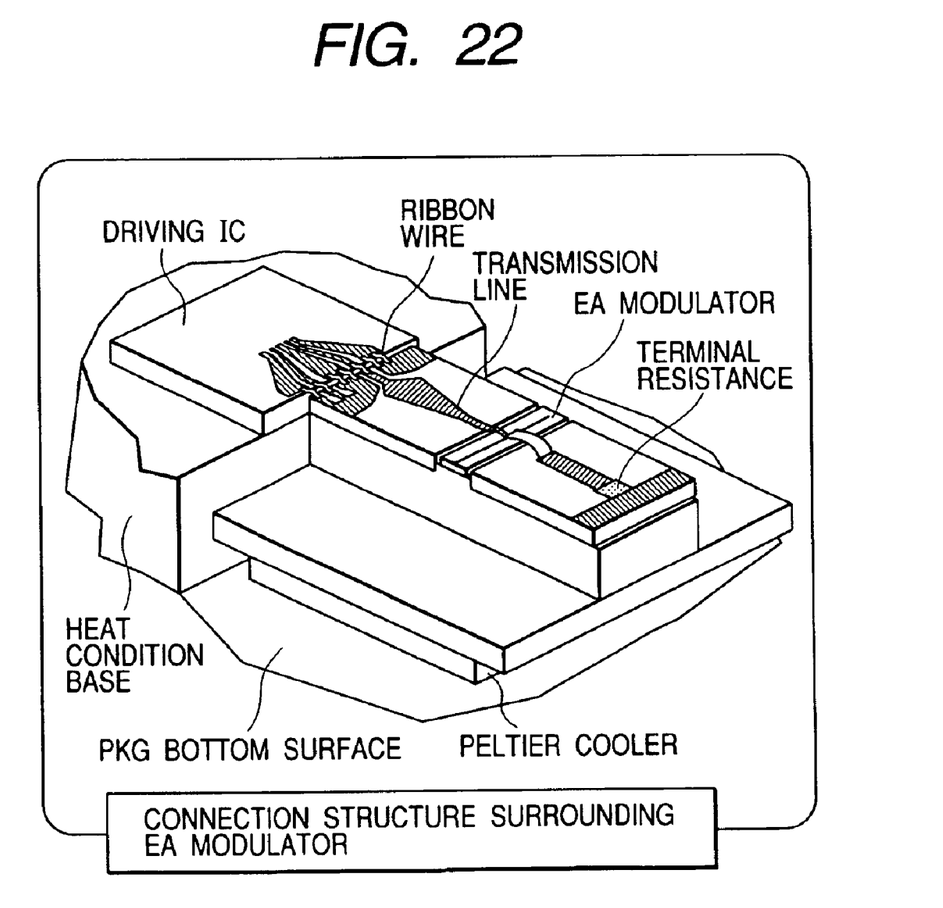
FIG. 22 is a perspective view of the connection structure surrounding a modulator as shown in FIG. 21.

FIG. 22 shows the perspective view of the optical transmission device centering on the modulator and the driving IC. The voltage as applied from the driving IC is conducted through a substrate on which a transmission line is provided to the modulator and further to the terminal resistance.

The driving IC is joined to a base substrate of high heat conduction, which base is soldered on the bottom surface of a package. The transmission line substrate is jointed to a substrate above a Peltier cooler, which cooler is soldered on the package bottom surface. The modulator and the terminal resistance are provided on a substrate above the Peltier cooler in the same way as the transmission line substrate.

The driving IC is connected to the transmission line through ribbon wires while the modulator and the transmission line as well as the modulator and the terminal resistance are connected by wire bonding or wire ribbons.

Figure 23:
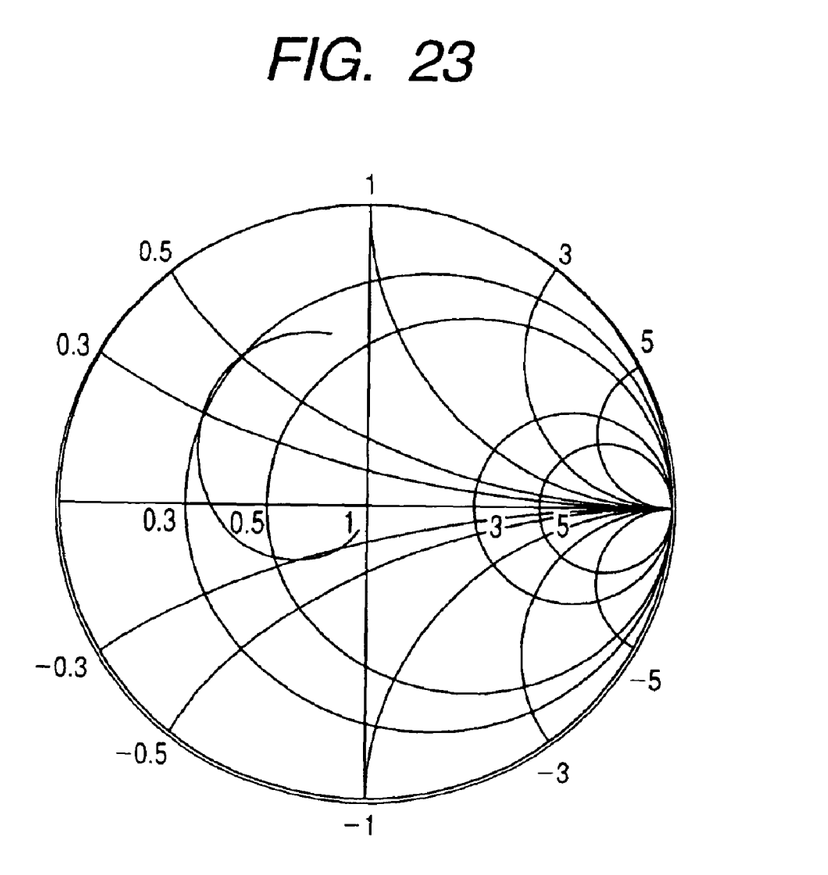
FIG. 23 is a view showing the Smith chart of a driving IC of the optical transmission device as shown in FIG. 21.
Figure 24:
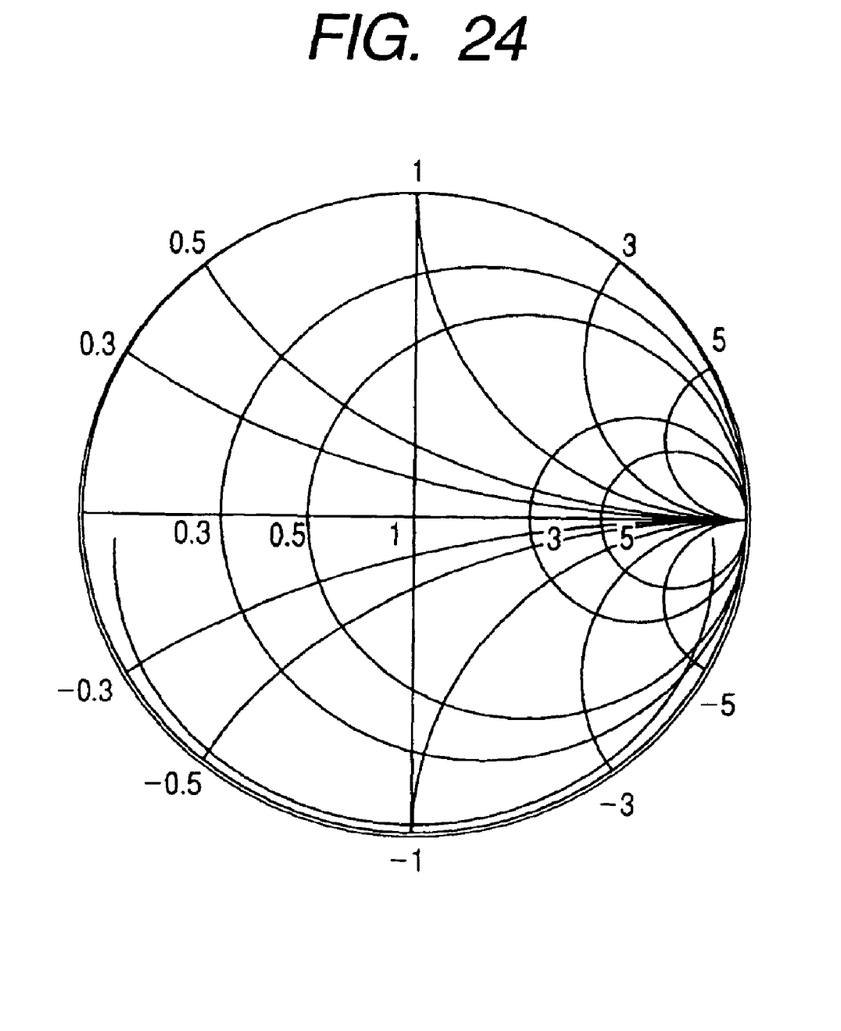
FIG. 24 is a view showing the Smith chart of a modulator of the optical transmission device as shown in FIG. 21.

To note, the driving IC as embodied in the present example is a device whose impedance becomes smaller according as the frequency increases, which device has the impedance frequency characteristics as shown in the Smith chart of FIG. 23. In turn, the modulator is a device whose impedance becomes larger according as the frequency increases, which device has the impedance frequency characteristics as shown in FIG. 24.

Figure 1:
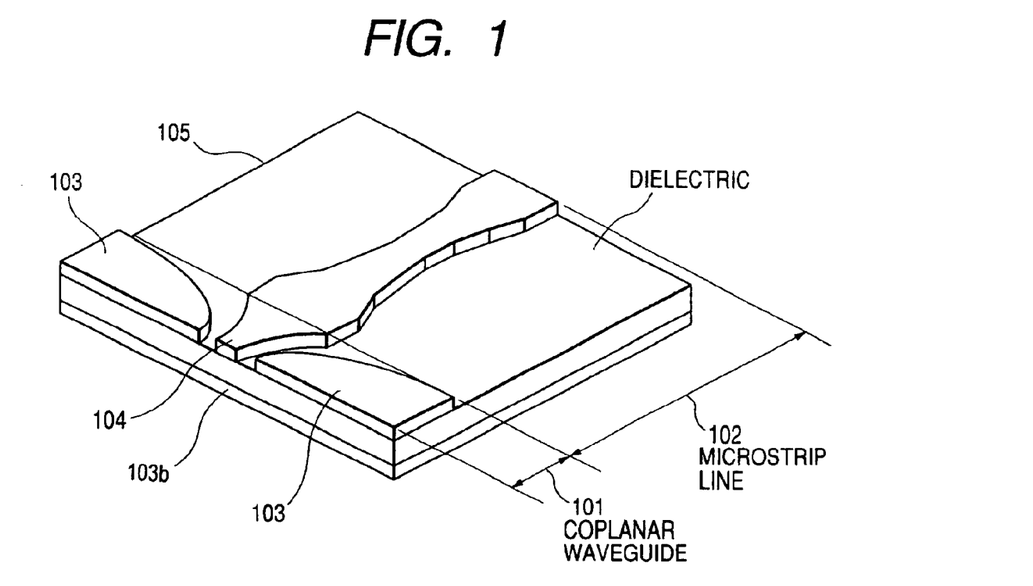
FIG. 1 is a view showing a filter transmission line substrate according to the present invention.

The transmission line substrate as outlined above is described below in more details with reference to the perspective view thereof in FIG. 1.

This transmission line substrate comprises a dielectric (white base color area) 105, a signal line 104 as provided above the dielectric 105, a ground layer 103 having a lower ground layer 103b extending over the lower surface of the dielectric 105 and an upper ground layer as connected through holes to the lower ground layer and as interposing the signal line 104. The signal line 104 and the upper ground layer 103 are formed into the configuration as shown in FIG. 1 such that a metallic layer as formed above the dielectric is etched so as to be configured a tapered shape.

The structure of the transmission line substrate being divided into two sections, it is separated into a coplanar waveguide structure 101 and a microstrip line structure 102.

The coplanar waveguide 101 is arranged such that both sides of the signal line 104 is interposed by the upper ground layers through the dielectric as provided above the lower ground layer, which signal line and upper ground layer are connected to a signal terminal of the driving IC and a ground layer terminal thereof, respectively. In order to realize the impedance matching with the driving IC and that with the microstrip line structure, the area of the upper ground layers becomes gradually narrower while the width of the signal line 104 becomes gradually wider.

The microstrip line structure 102 is arranged such that it is disposed on the dielectric above the lower ground layer 103b without providing the upper ground layers to the right and left sides of the signal line 104 with regard to the longitudinal direction thereof.

The signal line corresponding to the microstrip line is broadest in width at a boundary (conversion section) between the coplanar waveguide and a microstrip line while becoming stepwise narrower towards the output end side until becoming wider again. In this way, the configuration of the signal line acutely varies with respect to the transmission direction, which line width varies at the maximum angle of 90 degrees. Accordingly, the riddance of farfetched concave and convex configurations that cause the reflection of high frequency signals allows such reflection to be subdued.

To note, the continuous variation of the width of the signal line as described above is viewed in FIG. 1 with a polygonal configuration, but may be arc-shaped.

Figure 19:
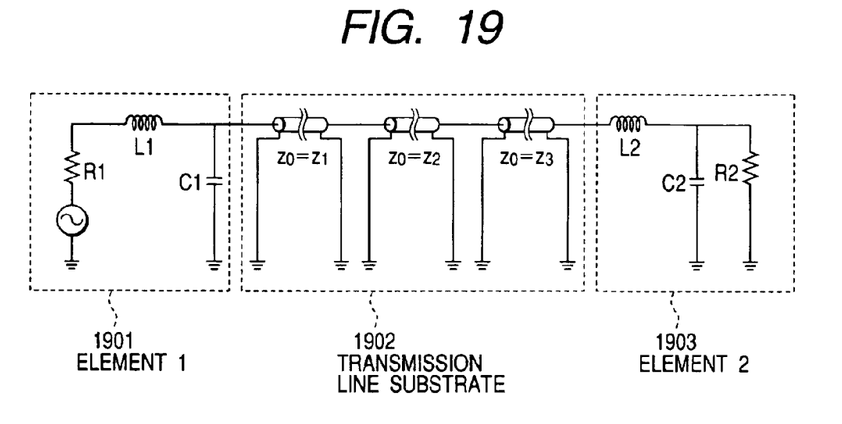
FIG. 19 is a view showing an equivalent circuit model for simulating the characteristics of the frequency of transmission line vs. gain thereof S21.

Then, as shown in FIG. 19, which shows an equivalent circuit for simulating the characteristics of the frequency of the transmission line vs. the gain thereof S21, where the impedance of the transmission line substrate is regarded as an equivalent circuit that interconnects functional units of different impedances, for examples, z1, z2 and z3, the impedance of the transmission line substrate is arranged such that it meets the condition of $z1 > z2 > z3$, $z2 < (z1+z3)/2$, which results in a higher gain S21 at the high frequency level of 1–23 GHz or more as shown in FIG. 20, which shows the simulation result of the characteristics of the frequency of the transmission line vs. the gain thereof S21, in comparison with the case where the interval between the respective ends of the microstrip line is linearly formed ($z2=(z1+z3)/2$). To note, the z1 as noted above amounts to an impedance at the input end side of the coplanar waveguide and approximates to the impedance of the driving IC while the z3 as noted above amounts to an impedance at the output end side of the microstrip line and approximates to the impedance of the EA modulator. Further, the z2 as noted above amounts to an impedance that is sandwiched between the z1 and z3.

Then, another embodiment of the high frequency transmission line substrate according to the present invention is described below.

Figure 2:
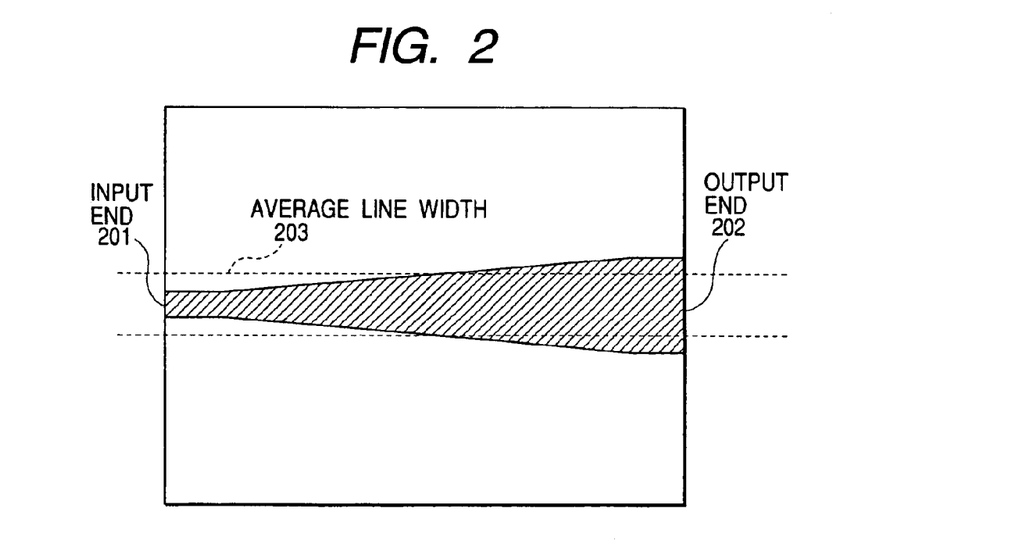
FIG. 2 is a view showing one example of a microstrip line substrate as referred in the description.

FIG. 2 is a view of an impedance conversion microstrip line as incorporated herein for reference. It is found that the characteristic impedance $Z (=\sqrt{L/C})$ of the microstrip line at the input end side 201 is large because the width thereof is narrow so that the inductance L thereof is large while the capacitance C thereof being small. On the other hand, it is found that the width thereof at the output end side is broad so that the characteristic impedance thereof is small. The interval between the input and output end sides is required to slowly and continuously vary in order to restrain reflection at the minimum, which interval configuration is typical for the signal line connecting a functional unit of a large characteristic impedance to that of a small one. Then, the signal line connecting a functional unit of a small characteristic impedance to that of a large one has a configuration as obtained by replacing the input end with the output end as shown in FIG. 2. Where the functional units of the same characteristic impedance are connected to each other, the line width of the input and output ends and the interval thereof is constant.

Figure 3:
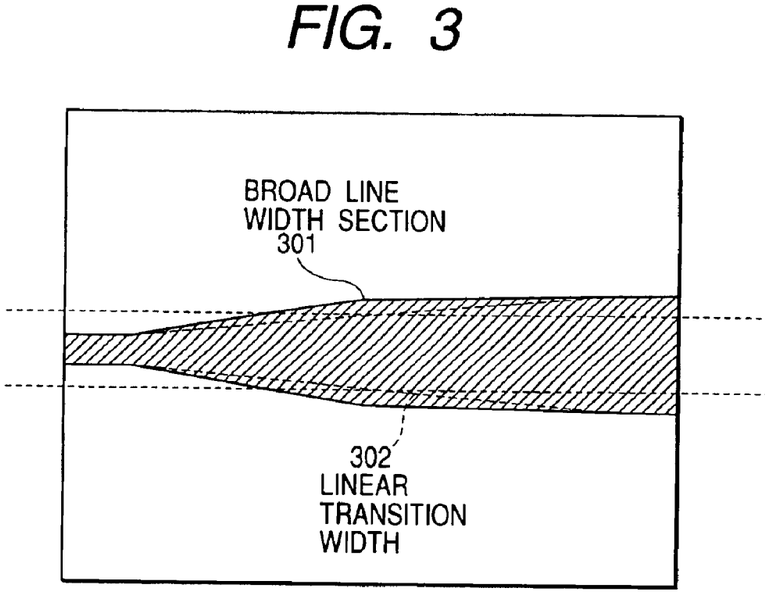
FIG. 3 is a view showing a wide filter transmission line substrate.

FIG. 3 shows one arrangement of a high frequency microstrip line substrate, which arrangement is characterized in that a broad width line section 301 is provided in the middle of the signal line without linearly varying the signal line, which makes the characteristic impedance at the middle portion Z2 of the microstrip line small.

The arrangement as shown in FIG. 3 being regarded as an equivalent circuit as shown in FIG. 19 having the respective impedances of the transmission line substrate 1902, it results in the condition of z1; $z2 > z3$, $z2 < (z1+z3)/2$. As shown in FIG. 20, which shows the simulation result of the frequency of the microstrip transmission line vs. the gain thereof S21 as graphed every widths thereof, a higher gain S21 is obtained at the high frequency level of 37 GHz or more in comparison with the case where the interval between the respective ends of the microstrip line is linearly formed ($z2=(z1+z3)/2$). In other words, the provision of the transmission line substrate as shown in FIG. 3 with the middle portion thereof widened meets the above condition, which allows the transmission characteristic of the high frequency ranging from 37 GHz through 80 GHz to improve.

Figure 4:
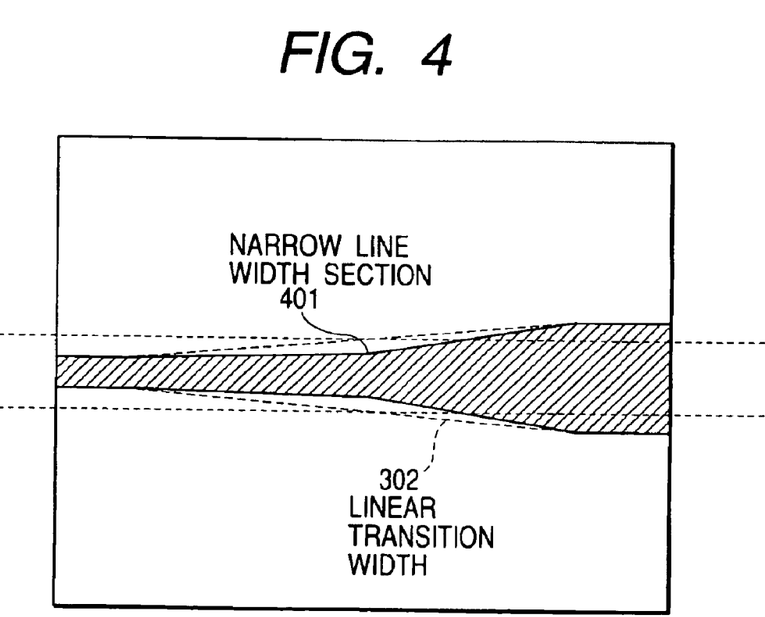
FIG. 4 is a view showing a narrow filter transmission line substrate.

FIG. 4 is another arrangement of the microstrip line according to the present invention.

This arrangement is provided with a narrow width line section 401, which makes the characteristic impedance of the middle portion Z2 of the microstrip line large. The transmission line substrate as arranged above being regarded as an equivalent circuit as shown in FIG. 19, it results in the condition of $z1 > z2 > z3$, $z2 > (z1+z3)/2$. As clear from FIG. 20, in comparison with the case where the interval between the respective ends of the microstrip line is linearly formed ($z2=(z1+z3)/2$), a higher gain S21 is obtained at the high frequency level ranging from 1 GHz through 23 GHz. In other words, the provision of the transmission line substrate as shown in FIG. 4 with the middle portion thereof narrowed meets the above condition, which allows the characteristics of the transmission with the frequency ranging from 1 GHz through 23 GHz to improve.

Figure 5:
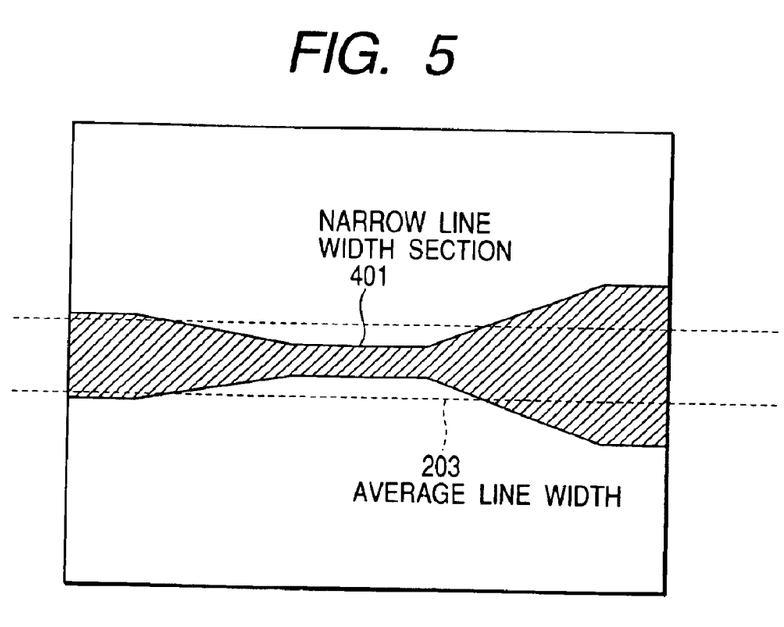
FIG. 5 is a view showing a concave filter transmission line substrate.

The transmission line substrate as shown in FIG. 5 is provided with wider ends than the average line width and with a narrower middle portion, which meets the condition of $z2 > z1 > z3$, $z2 > (z1+z3)/2$. Accordingly, in the same way as the arrangement as shown in FIG. 4, a higher gain S21 is obtained at the frequency ranging from 1 GHz through 23 GHz.

Figure 6:
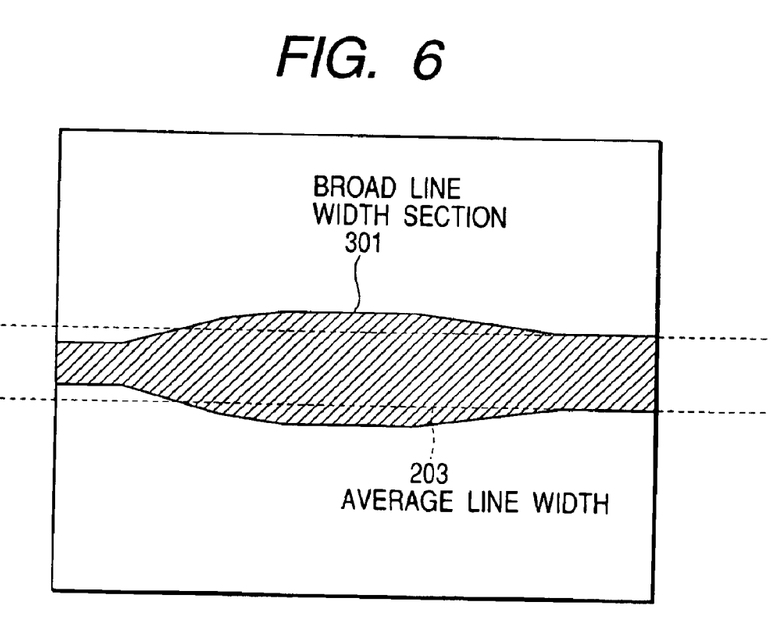
FIG. 6 is a view showing a convex filter transmission line substrate.

The transmission line substrate as shown in FIG. 6 is provided with narrower ends than the average line width and with a wider middle portion, which meets the condition of $z1 > z3 > z2$, $z2 < (z1+z3)/2$. Accordingly, in the same way as the arrangement as shown in FIG. 3, a higher gain S21 is obtained at the high frequency ranging from 37 GHz through 80 GHz.

Figure 7:
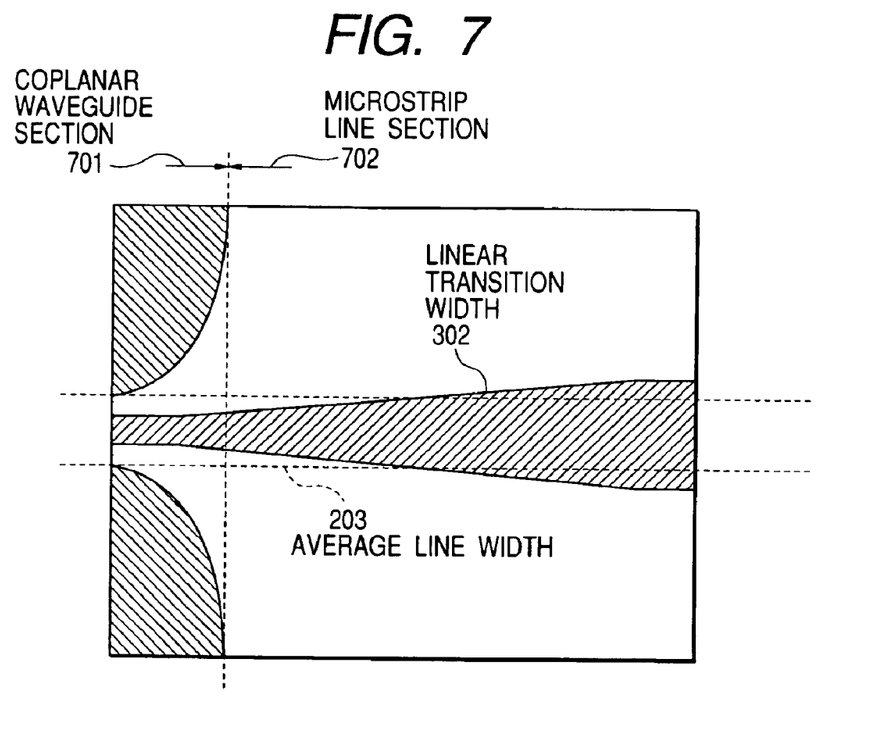
FIG. 7 is a view showing an impedance conversion substrate of the coplanar waveguide-microstrip conversion.

The transmission line substrate as shown in FIG. 7 is one example to show the arrangement that one of the input and output ends thereof is provided with the coplanar waveguide section 701, together with which section the microstrip section 702 is provided.

Figure 8:
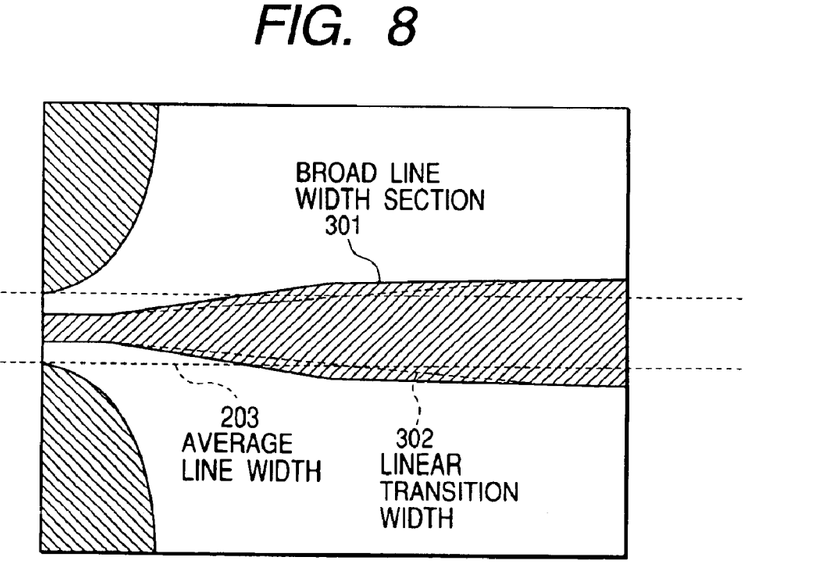
FIG. 8 is a view showing a wide filter transmission line substrate of the coplanar waveguide-microstrip conversion.

The substrate as shown in FIG. 8 is provided with a broad width line section 301 at the middle portion thereof, which makes the characteristic impedance of the middle portion thereof small. This arrangement being regarded as the equivalent circuit as shown in FIG. 19, it results in the condition of z1> z2> z3, z2<(z1+z3)/2. As clear from FIG. 20, a higher gain S21 is obtained at the high frequency level ranging from 37 GHz through 80 GHz in comparison with the case where the substrate as shown in FIG. 7 is put to use (z2=(z1+z3)/2).

Figure 9:
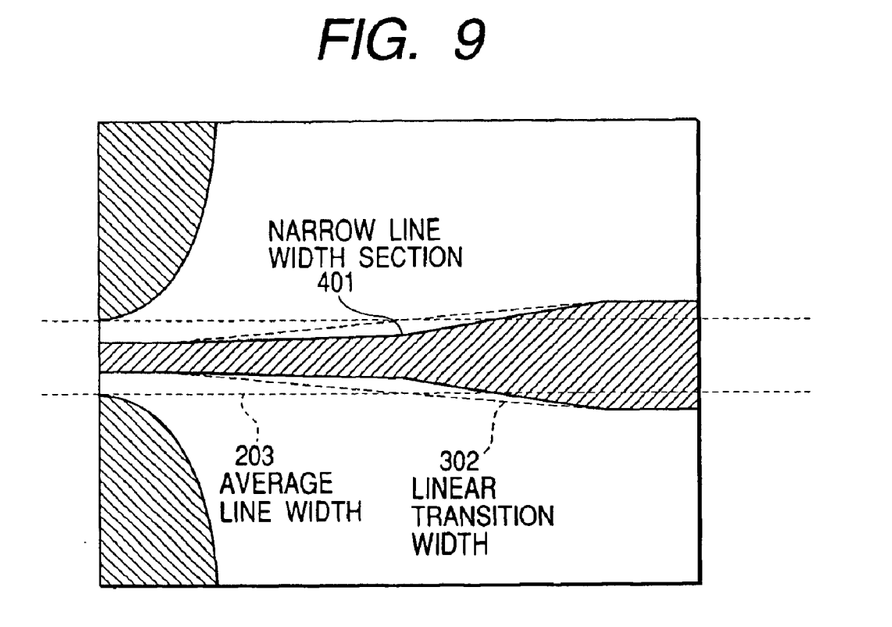
FIG. 9 is a view showing a narrow filter transmission line substrate of the coplanar waveguide-microstrip conversion.

FIG. 9 shows the coplanar waveguide applied to one end side of the substrate of FIG. 4. This arrangement being regarded as the equivalent circuit as shown in FIG. 19, it results in the condition of z1> z2> z3, z2> (z1+z3)/2. As clear from FIG. 20, a higher gain S21 is obtained at the frequency level ranging from 1 GHz through 23 GHz in comparison with the substrate as shown in FIG. 8 (z2=(z1+z3)/2).

Figure 10:
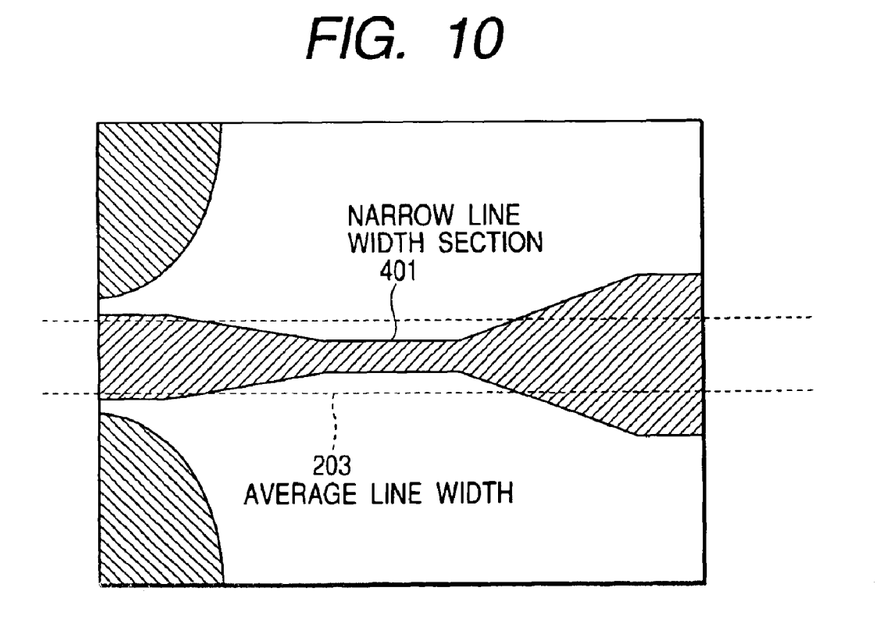
FIG. 10 is a view showing a concave filter transmission line substrate of the coplanar waveguide-microstrip conversion.

FIG. 10 shows the coplanar waveguide applied to one end of the substrate as shown in FIG. 5. In terms of the equivalent circuit as shown in FIG. 19, it results in the condition of z2> z1> z3. A higher gain S21 is obtained at the frequency level ranging from 1 GHz through 23 GHz.

Figure 11:
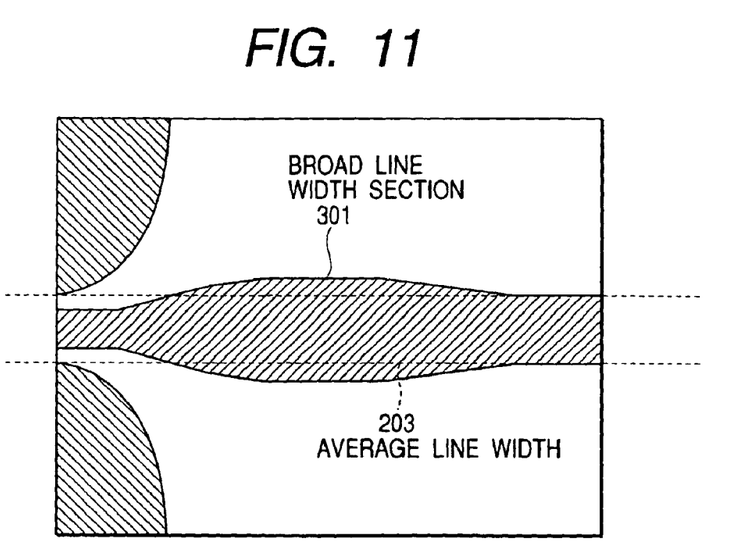
FIG. 11 is a view showing a convex filter transmission line substrate of the coplanar waveguide-microstrip conversion.

FIG. 11 shows the coplanar waveguide applied to one end of the substrate as shown in FIG. 6. In terms of the equivalent circuit as shown in FIG. 19, it results in the condition of z1> z3> z2. A higher gain S21 is obtained at the high frequency level.

Figure 12:
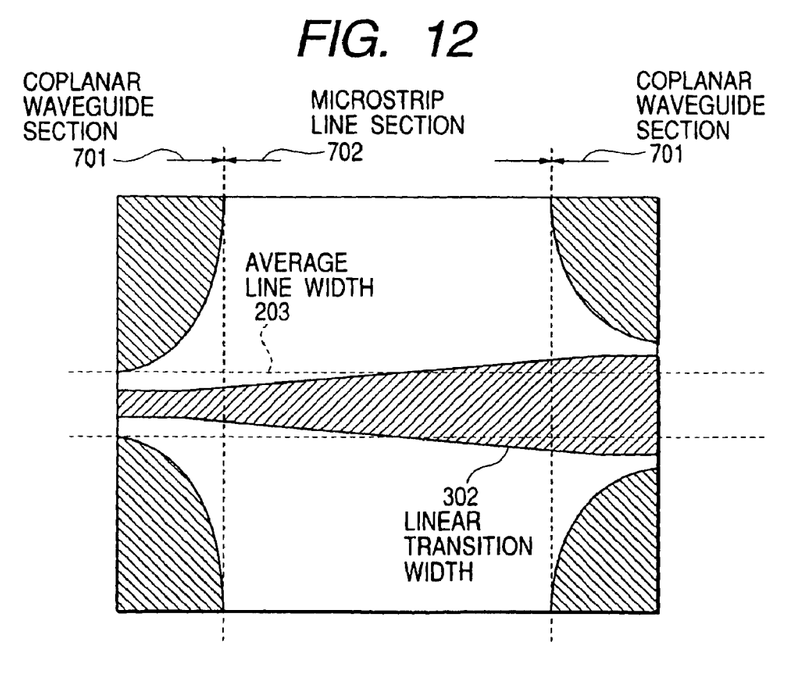
FIG. 12 is a view showing an impedance conversion substrate of the CPW-MSL-CPW conversion.

FIG. 12 an example of the substrate to show the arrangement that both input and output ends thereof are provided with the coplanar waveguide sections 701, between which sections a microstrip line section 702 is interposed.

Figure 13:
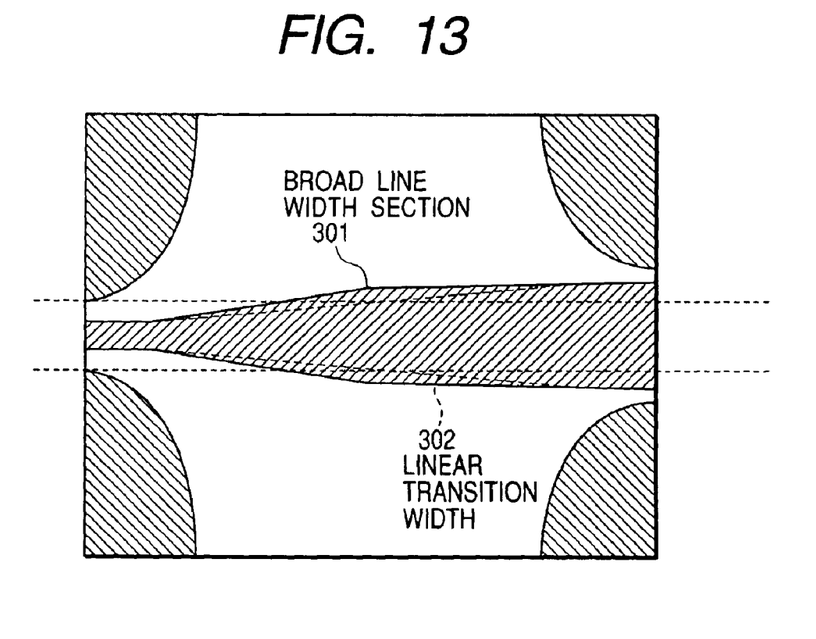
FIG. 13 is a view showing a wide filter transmission line substrate of the CPW-MSL-CPW conversion.

FIG. 13 shows the coplanar waveguide applied to the respective input and output ends of the substrate as shown in FIG. 3. In terms of the equivalent circuit, it results in the condition of z1> z2> z3, z2<lt; (z1+z3)/2. Accordingly, as clear from FIG. 20, in comparison with the case where the substrate as shown in FIG. 13 is put to use (z2=(z1+z3)/2), a higher gain S21 is obtained at the frequency level ranging from 37 GHz through 80 GHz.

Figure 14:
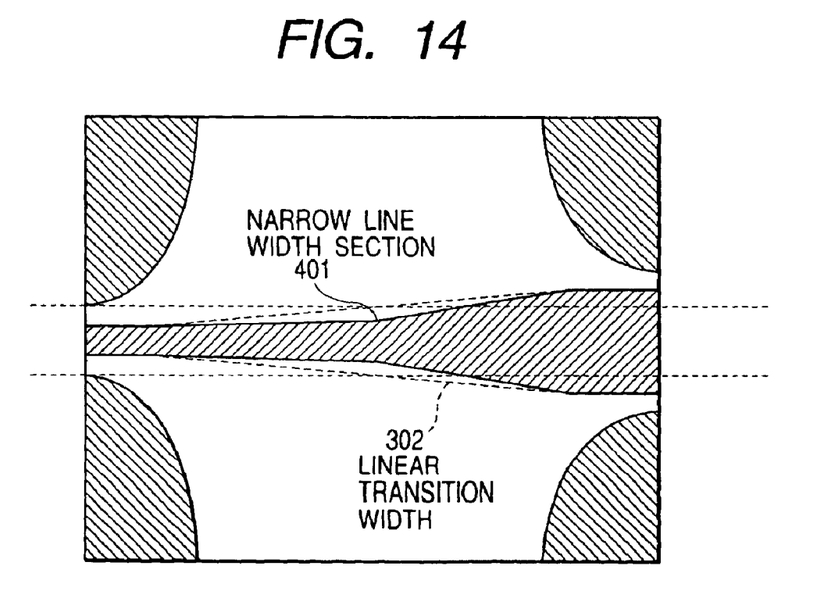
FIG. 14 is a view showing a narrow filter transmission line substrate of the CPW-MSL-CPW conversion.

FIG. 14 shows the coplanar waveguide applied to the respective input and output ends of the substrate as shown in FIG. 4. In terms of the equivalent circuit, it results in the condition of z1> z2> z3, z2> (z1+z3)/2. Accordingly, as clear from FIG. 20, a higher gain S21 is obtained at the frequency level ranging from 1 GHz through 23 GHz in comparison with the case where the substrate as shown in FIG. 12 is put to use (z2=(z1+z3)/2).

Figure 15:
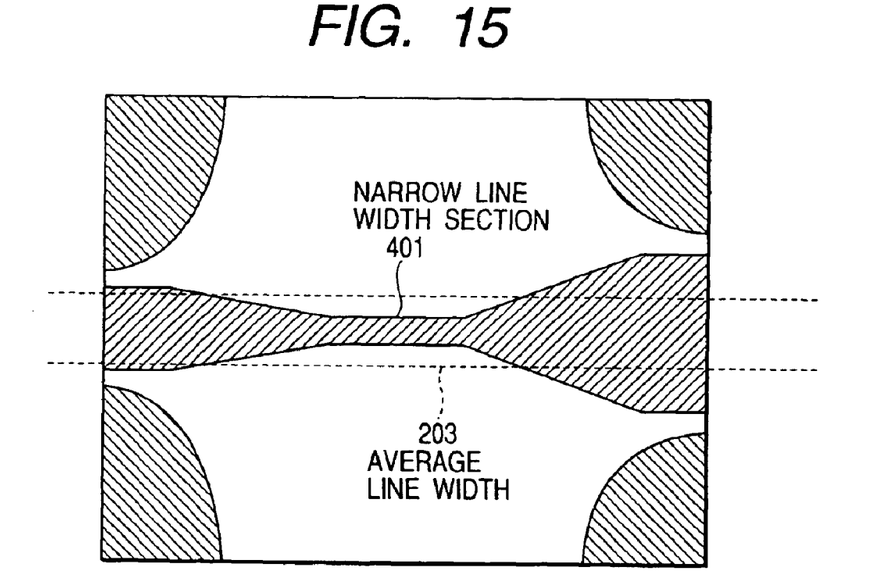
FIG. 15 is a view showing a concave filter transmission line substrate of the CPW-MSL-CPW conversion.

FIG. 15 shows the coplanar waveguide applied to the output end of the substrate as shown in FIG. 5. In terms of the equivalent circuit, it results in the condition of z2> z1> z3. A higher gain S21 is obtained at the frequency level ranging from 1 GHz through 23 GHz in comparison with the case where the substrate as shown in FIG. 12 is put to use.

Figure 16:
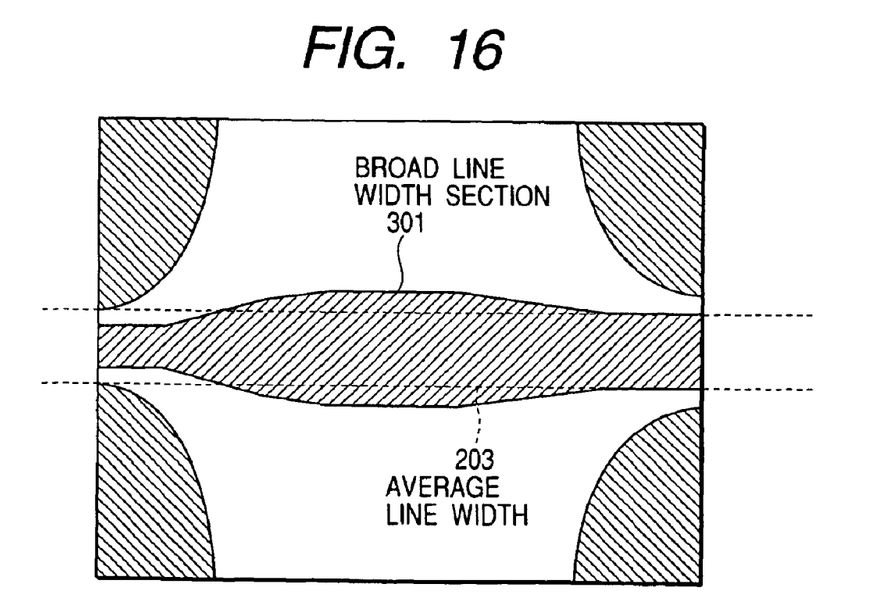
FIG. 16 is a view showing a convex filter transmission line substrate of the CPW-MSL-CPW conversion.

FIG. 16 shows the coplanar waveguide applied to the output end of the substrate as shown in FIG. 6. In terms of the equivalent circuit, it results in the condition of z1> z3> z2. A higher gain S21 is obtained at the frequency level ranging from 37 GHz through 80 GHz.

Figure 17:
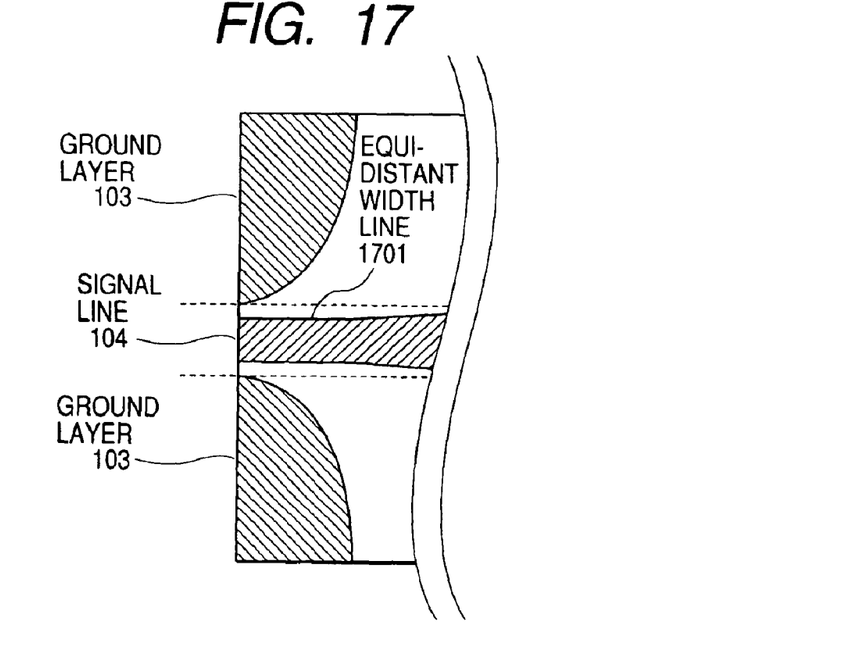
FIG. 17 is a view showing an equidistant line of the CPW-MSL conversion.

As for the coplanar-microstrip conversion section of the coplanar waveguide section of FIGS. 7 through 16, the signal line 104 interposed between the ground layers 103 may be arranged such that an equidistant line 1701 as shown in FIG. 17 is adopted for the coplanar section so as to continuously increase the characteristic impedance of the line.

Figure 18:
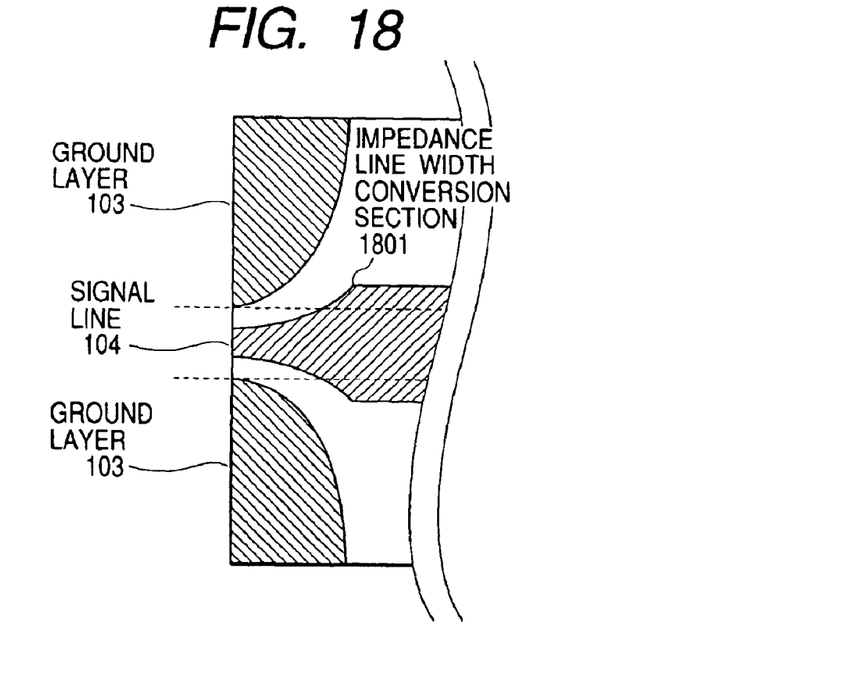
FIG. 18 is a view showing an impedance line width of the CPW-MSL conversion.

Further, the signal line 104 as interposed between the ground layers 103 may be broadened in width by means of an impedance line width conversion section 1801 as shown in FIG. 18 according as the interval between the ground layers 103 is widened at the coplanar section, which makes the impedance at the coplanar section constant or converted into an impedance as desired.

To note, although not shown in the drawings, where the impedance characteristics of the functional units as described above is reversed, the input and output ends of the signal line are also reversed. In other words, where the means whose impedance increases in proportion to the increase of frequency level is disposed at the output side of the substrate while the means whose impedance decreases in inverse proportion to the increase thereof is disposed at the input side thereof, the input and output ends of the signal line are reversed.

The present invention allows the signal transmission characteristics for the high frequency level of 1 GHz or more to improve.

The present invention may be embodied in other specific forms without departing from the spirit or essential characteristics thereof. The present embodiment is therefore to be considered in all respects as illustrative and not restrictive, the scope of the invention being indicated by the appended rather than by the foregoing description and all changes which come within the meaning and range of equivalency of the claims are therefore intended to be embraced therein.

What is claimed is:

1. An optical modulation device comprising:
   a transmission line substrate that is provided with a coplanar waveguide and a microstrip line;
   a first means whose input impedance becomes large in proportion to an increase of frequency, said first means being connected to said coplanar waveguide; and
   a second means whose output impedance becomes small in inverse proportion to the increase of frequency, said second means being connected to said microstrip line,
   wherein a planar configuration of a signal line corresponding to said microstrip line is arc-shaped or provided with a constriction that varies at an angle of 90 degrees or less with regard to an average width of said signal line, which constriction is narrower in width than the average width extending through respective ends of said signal line.

2. An optical modulation device according to claim 1, wherein a modulator whose output impedance becomes small in inverse proportion to the increase of frequency is connected to said microstrip line and a driving IC whose input impedance becomes large in proportion thereto is connected to said coplanar waveguide, said driving IC controlling a voltage as applied to said modulator.

3. An optical modulation device comprising:
   a transmission line substrate that is provided with a coplanar waveguide and a microstrip line;
   a first means whose input impedance becomes large in proportion to an increase of frequency, said first means being connected to said coplanar waveguide; and
   a second means whose output impedance becomes small in inverse proportion to the increase of frequency, said second means being connected to said microstrip line,
   wherein a planar configuration of a signal line corresponding to said microstrip line is arc-shaped or provided with a protrusion that varies at an angle of 90 degrees or less with regard to an average width of said signal line, which protrusion is broader in width than the average width extending through respective ends of said signal line.

4. An optical modulation device according to claim 3 wherein a modulator whose output impedance becomes small in inverse proportion to the increase of frequency is connected to said microstrip line and a driving IC whose input impedance becomes large in proportion thereto is connected to said coplanar waveguide, said driving IC controlling a voltage as applied to said modulator.

5. An optical modulation device comprising:
a transmission line substrate that is provided with a coplanar waveguide and a microstrip line;
a driving IC whose input impedance becomes large in proportion to an increase of frequency, said driving IC being connected to said coplanar waveguide; and
a modulator whose output impedance becomes small in inverse proportion to the increase of frequency, said modulator being connected to said microstrip line,
wherein a planar configuration of a signal line corresponding to said microstrip line is arc-shaped or provided with a constriction that varies at an angle of 90 degrees or less with regard to an average width of said signal line, which constriction is narrower in width than the average width extending through respective ends of said signal line.

6. An optical modulation device according to claim 5, wherein said driving IC controls a voltage as applied to said modulator.

7. An optical modulation device comprising:
a transmission line substrate that is provided with a coplanar waveguide and a microstrip line;
a driving IC whose input impedance becomes large in proportion to an increase of frequency, said driving IC being connected to said coplanar waveguide; and
a modulator whose output impedance becomes small in inverse proportion to the increase of frequency, said modulator being connected to said microstrip line,
wherein a planar configuration of a signal line corresponding to said microstrip line is arc-shaped or provided with a protrusion that varies at an angle of 90 degrees or less with regard to an average width of said signal line, which protrusion is broader in width than the average width extending through respective ends of said signal line.

8. An optical modulation device according to claim 7, wherein said driving IC controls a voltage as applied to said modulator.

9. An optical modulation device comprising:
a transmission line substrate that is provided with a coplanar waveguide and a microstrip line;
a driving IC whose input impedance becomes large in proportion to an increase of frequency, said driving IC being connected to, said coplanar waveguide; and
an EA modulator whose output impedance becomes small in inverse proportion to the increase of frequency, said EA modulator being connected to said microstrip line,
wherein a planar configuration of a signal line corresponding to said microstrip line comprises a narrowed arc-shape in the middle of the signal line.

10. An optical modulation device comprising:
a transmission line substrate that is provided with a coplanar waveguide and a microstrip line;
a driving IC whose input impedance becomes large in proportion to an increase of frequency, said driving IC being connected to said coplanar waveguide; and
an EA modulator whose output impedance becomes small in inverse proportion to the increase of frequency, said EA modulator being connected to said microstrip line,
wherein a planar configuration of a signal line corresponding to said microstrip line is smoothly narrowed in the middle of the signal line comprising the microstrip line.

11. An optical modulation device comprising:
a transmission line substrate that is provided with a coplanar waveguide and a microstrip line;
a driving IC whose input impedance becomes large in proportion to an increase of frequency, said driving IC being connected to said coplanar waveguide; and
an EA modulator whose output impedance becomes small in inverse proportion to the increase of frequency, said EA modulator being connected to said microstrip line,
wherein a planar configuration of a signal line corresponding to said microstrip line is constricted in the middle, the width of the constriction being changed at less than 90 degrees to the direction of transmitting signal.

12. An optical modulation device comprising:
a transmission line substrate that is provided with a coplanar waveguide and a microstrip line;
a driving IC whose input impedance becomes large in proportion to an increase of frequency, said driving IC being connected to said coplanar waveguide; and
an EA modulator whose output impedance becomes small in inverse proportion to the increase of frequency, said EA modulator being connected to said microstrip line,
wherein a planar configuration of a signal line corresponding to said microstrip line comprises a broader arc-shape in the middle of the signal line.

13. An optical modulation device comprising:
a transmission line substrate that is provided with a coplanar waveguide and a microstrip line;
a driving IC whose input impedance becomes large in proportion to an increase of frequency, said driving IC being connected to said coplanar waveguide; and
an EA modulator whose output impedance becomes small in inverse proportion to the increase of frequency, said EA modulator being connected to said microstrip line,
wherein a planar configuration of a signal line corresponding to said microstrip line is smoothly broad in the middle of the signal line comprising the microstrip line.

14. An optical modulation device comprising:
a transmission line substrate, that is provided with a coplanar waveguide and a microstrip line;
a driving IC whose input impedance becomes large in proportion to an increase of frequency, said driving IC being connected to said coplanar waveguide; and
an EA modulator whose output impedance becomes small in inverse proportion to the increase of frequency, said EA modulator being connected to said microstrip line,
wherein a planar configuration of a signal line corresponding to said microstrip line is spread out in the middle, the width of spread being smoothly changed at less than 90 degrees to the direction of transmitting signal.

* * * * *